United States Patent [19]

Yamamoto

[11] Patent Number: 5,415,044
[45] Date of Patent: May 16, 1995

[54] SEMICONDUCTOR ACCELERATION SENSOR INCLUDING MEANS FOR DETECTING WEIGHT DETACHMENT

[75] Inventor: Masahiro Yamamoto, Itami, Japan

[73] Assignee: Mitsubishi Denki Kabushiki Kaisha, Tokyo, Japan

[21] Appl. No.: 182,696

[22] Filed: Jan. 13, 1994

[30] Foreign Application Priority Data

Jan. 14, 1993 [JP] Japan .................. 5-005137

[51] Int. Cl.⁶ .............................................. G01P 15/12
[52] U.S. Cl. ..................................... 73/517 R; 338/2
[58] Field of Search ................ 73/517 R, 1 D, 497; 338/2, 5

[56] References Cited

U.S. PATENT DOCUMENTS 5,081,867  1/1992  Yamada ........................ 73/517 R
5,103,667  4/1992  Allen et al. ....................... 73/1 D

FOREIGN PATENT DOCUMENTS 3206663  8/1988  Japan .................. 73/517 R
46471    1/1992  Japan .................. 73/517 R Primary Examiner—Hezron E. Williams
Assistant Examiner—Helen C. Kwok
Attorney, Agent, or Firm—Leydig, Voit & Mayer

[57] ABSTRACT

A semiconductor acceleration sensor includes at least two mutually independent electrodes on a surface of an acceleration sensing beam to which a weight is secured, the surface of the weight being electrically conductive and connecting the electrodes together. The electrodes are serially connected with a power supply for a bridge circuit. When the weight is separated from the acceleration sensing beam, disconnection of the electrodes on the beam occurs and the bridge is disconnected from the power supply, producing an abnormal output. Thus, it is possible to positively sense separation of the weight from the beam.

3 Claims, 4 Drawing Sheets

SEMICONDUCTOR ACCELERATION SENSOR INCLUDING MEANS FOR DETECTING WEIGHT DETACHMENT

BACKGROUND OF THE INVENTION

1. Field of the Invention

The present invention relates to a semiconductor acceleration sensor and particularly to a semiconductor acceleration sensor which may be used, for example, in suspension control and anti-lock braking system (ABS) for vehicles.

2. Description of the Related Art

FIG. 5 and FIG. 6 show, in a side sectional view and a perspective view, respectively, a conventional semiconductor acceleration sensor. The sensor has a cap, which will be described later, the cap being illustrated in FIG. 5 but not illustrated in FIG. 6. Referring to these drawings, the sensor has an acceleration sensing bar or beam 1. Gauge resistors 2, utilizing the piezoresistive effect of a semiconductor, are formed at a certain position of the acceleration sensing beam 1 on one of a pair of opposed surfaces of the beam 1 (on an upper surface, as viewed in FIGS. 5 and 6). The gauge resistors 2 are connected with each other to form the bridge of a bridge circuit. A diaphragm 3, i.e., a thinner portion of the beam, is formed at a position of the acceleration sensing beam 1 where the gauge resistors 2 are located by reducing the thickness of the beam 1 from the other surfaces (from a lower surface, as viewed in FIGS. 5 and 6). A first end of the acceleration sensing beam 1 is cantilevered by a footing 4 serving as the support at the second end of the cantilever structure.

A weight 5 for improving sensitivity is mounted to the first end of the acceleration sensing beam 1 with an adhesive. The footing 4 is attached to a base 6 serving as a part of an enclosure of the semiconductor acceleration sensor. A cap 7 serving as the other part of the enclosure of the sensor is mounted on the base 6 in such a manner as to define the interior of the device. Lead pins 8 for inputting and outputting electrical signals are retained by the base 6 by using an insulator, not shown. The acceleration sensing beam 1 and the lead pins 8 are electrically interconnected by wires 9.

In the conventional semiconductor acceleration sensor having the above construction, when an acceleration is applied to the sensor, the end portion of the acceleration sensing beam 1 having the weight 5 thereon swings vertically about the fulcrum, i.e., on the footing 4, whereby the beam 1 is deflected. The acceleration sensing beam 1 deflects at the thinner portion 3 so that stresses concentrate at that thinner portion 3 with the result that the resistances of the gauge resistors 2 change accordingly by virtue of the piezoresistive effect of the semiconductor. The changes in the resistances cause an imbalance in the bridge circuit including the gauge resistors 2, generating a potential difference, which is detected as the magnitude of the acceleration.

With the above-described conventional semiconductor acceleration sensor in the event that the weight 5 is separated from the beam 1 during operation, it is not possible to sense the separation since the gauge resistors 2 are only electrically connected to an external circuit. When the weight 5 is separated, sensitivity becomes very low, thereby involving the risk that acceleration applied to the sensor may not be properly sensed, thus resulting in erroneous operations.

SUMMARY OF THE INVENTION

An object of the present invention is to provide a semiconductor acceleration sensor positively sensing the separation of a weight when this occurs during operation.

In order to achieve the above object, according to one aspect of the present invention, there is provided a semiconductor acceleration sensor comprising: an acceleration sensing beam having a pair of opposed surfaces and a thinner portion with gauge resistors and on a surface of the beam opposite the thinner portion, the gauge resistors being connected with each other to form the bridge of a bridge circuit; a weight secured to a first end of the acceleration sensing beam; a footing supporting the acceleration sensing beam at a second end of the beam; a base on which the footing is mounted; electrical connection means for electrically connecting the gauge resistors with an external device; and at least two mutually independent electrodes on the surface of the first end portion of the acceleration sensing beam, a surface of the weight being an electrically conductive material at least at the interface between the weight and the beam where the weight is secured to the acceleration sensing beam, wherein the electrodes are serially connected with a power supply for the bridge circuit, and the electrodes and the electrically conductive material are electrically conducted with each other.

According to another aspect of the present invention, there is provided a semiconductor acceleration sensor comprising: an acceleration sensing beam having a pair of opposed surfaces, a thinner portion gauge resistors are located, the gauge resistors being connected with each other to form a bridge of a bridge circuit; a weight secured to a first end portion of the acceleration sensing beam; a footing supporting the acceleration sensing beam at a second end of the beam; a base on which the footing is mounted; electrical connection means for electrically connecting the gauge resistors with an external device; and at least two mutually independent electrodes on the surface of the first end, and a surface of the weight being electrically conductive and located at least at the interface between the weight and the beam where the weight is secured to the acceleration sensing beam, wherein the electrodes are connected with a power supply for the bridge circuit in parallel with the bridge circuit.

DESCRIPTION OF THE PREFERRED EMBODIMENTS

First Embodiment

Figure 1:
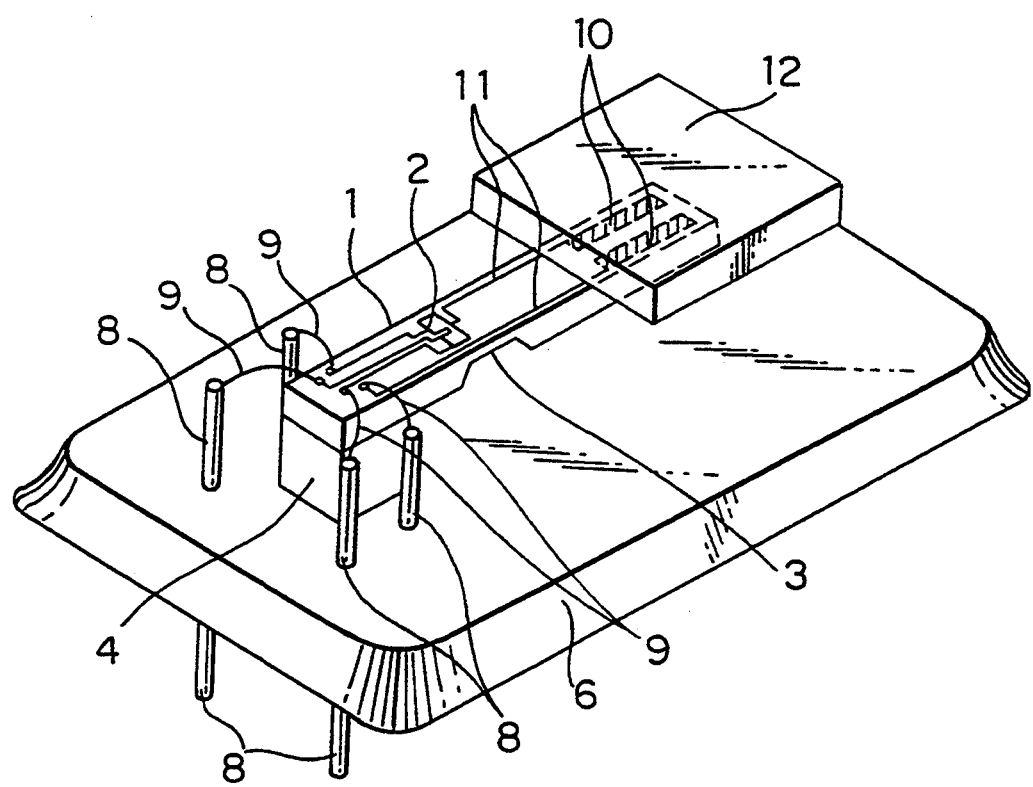
FIG. 1 is a perspective view showing a semiconductor acceleration sensor according to a first embodiment of the present invention.

FIG. 1 shows, in a perspective view, a semiconductor acceleration sensor according to a first embodiment of the present invention. The sensor has a cap, which is not illustrated in FIG. 1, in order to show the interior of the device. Referring to FIG. 1, an acceleration sensing beam 1 has a first end fixed to a footing 4, and a second end carrying a weight 12 secured thereto. A metal film or a like electrically conductive material, not shown, is disposed on a portion of the weight 12 such that the weight 12 has an electrically conductive material on a surface of the weight 12 that is secured to the acceleration sensing beam 1. On the other hand, two or more (two, in the illustrated example) mutually independent electrodes 10 made of aluminum are provided on a surface of the acceleration sensing beam 1 to which the weight 12 is secured. The aluminum electrodes 10 are connected by wiring means 11 such that the electrodes 10 are connected in series with respect to the bridge circuit including the gauge resistors 2. The weight 12 may be secured to the acceleration sensing beam 1 by a solder or the like, so that the two mutually independent electrodes 10 on the acceleration sensing beam 1 are electrically connected to each other through the electrically conductive material on the weight 12.

Figure 3:
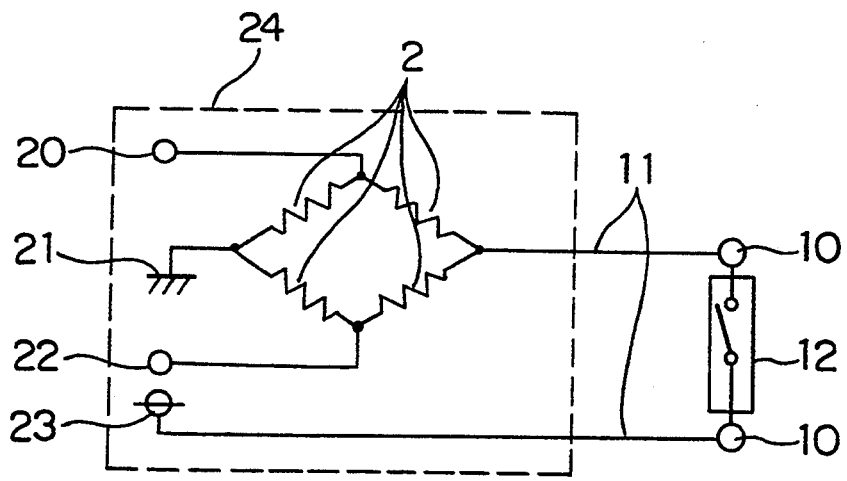
FIG. 3 is a diagram of a circuit of the semiconductor acceleration sensor shown in FIG. 1.

The semiconductor acceleration sensor constructed as above has a circuit shown in FIG. 3. A power supply voltage terminal 23 is serially connected through one of the electrodes 10 to the electrically conductive material on the weight 12 serving as a switch, and is further connected through the other electrode 10 to the bridge circuit 24. In the bridge circuit 24, the bridge formed by the interconnected gauge resistors 2 is connected to a sensor output (+) terminal 20, a sensor output (−) terminal 22, and a grounding terminal 21, as shown in FIG. 3.

The two mutually independent electrodes 10 on that surface of the acceleration sensing beam 1 to which the weight 12 is secured are joined by solder or the like to the electrically conductive material disposed on the surface of the weight 12 by which the weight 12 is secured to the beam 1. Therefore, the two electrodes 10 on the beam 1 are electrically connected with the electrically conductive material on the weight 12 during normal operation of the device. However, when the weight 12 is separated from the beam 1 during operation of the device, the electrically conductive material which has been electrically connected with the two electrodes 10 is also separated. As a result, disconnection occurs in the wiring means 11 for the bridge circuit including the gauge resistors 2. Thus, the separation of the weight 12 from the beam 1 causes the gauge resistors 2 to be disconnected from the power supply, with the result that the sensor produces an abnormal output. In this way, separation of the weight 12 can be readily detected. Since the weight 12 per se is used as a switch, and no additional circuit is used, the device can be easily produced.

Second Embodiment

Figure 2:
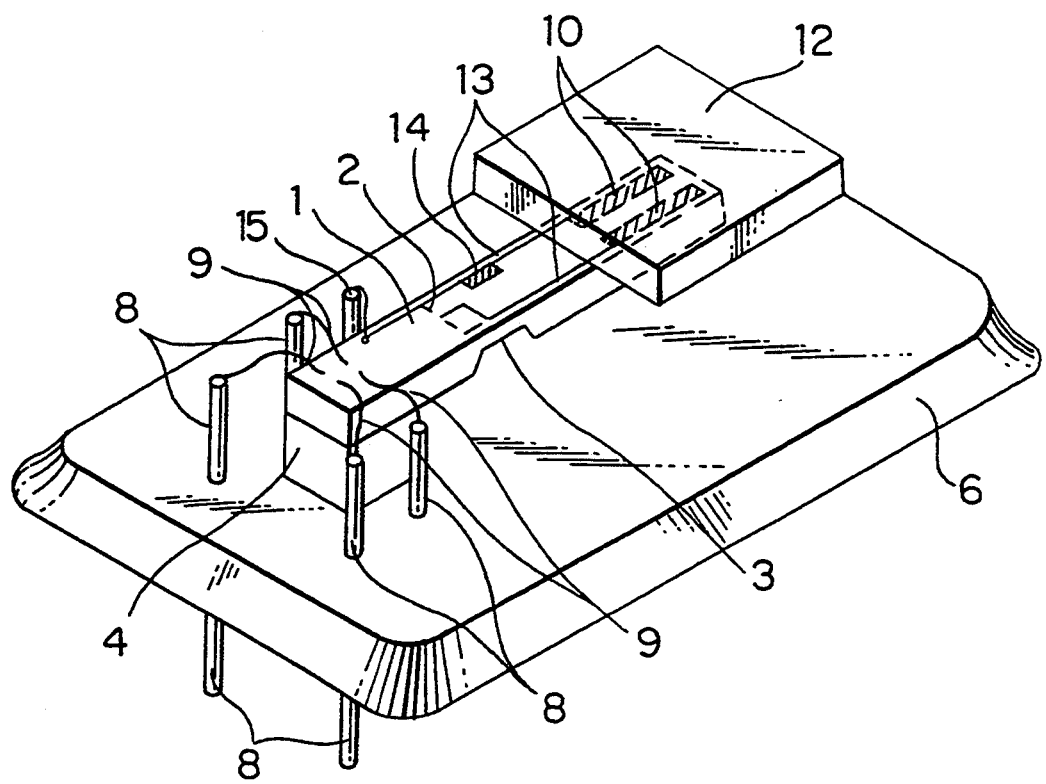
FIG. 2 is a perspective view showing a semiconductor acceleration sensor according to a second embodiment of the present invention.
Figure 4:
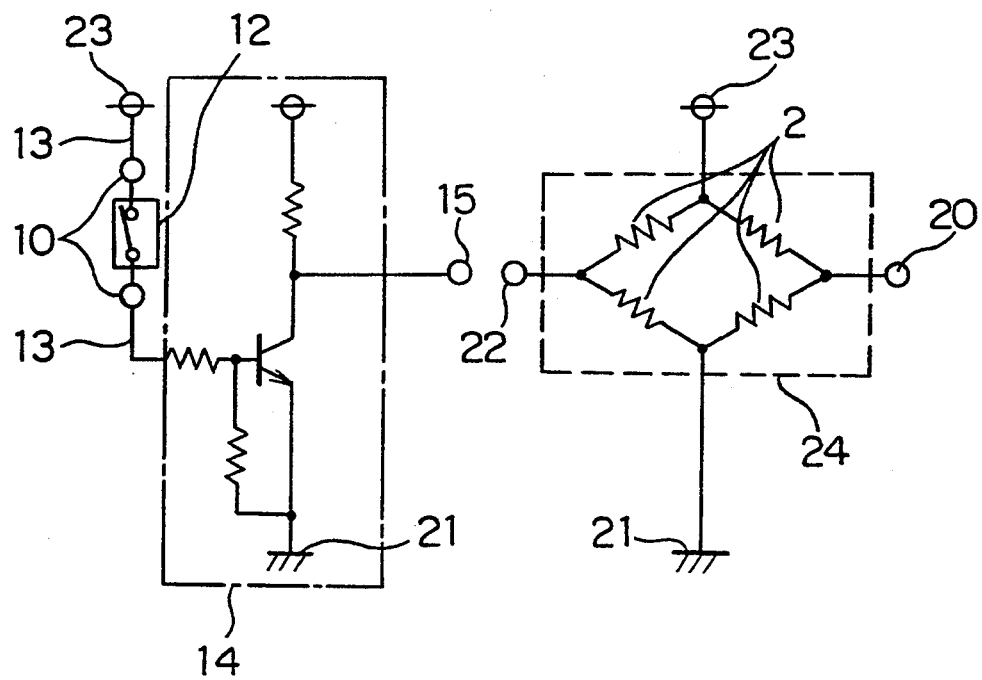
FIG. 4 is a diagram of a circuit of the semiconductor acceleration sensor shown in FIG. 2.
Figure 5:
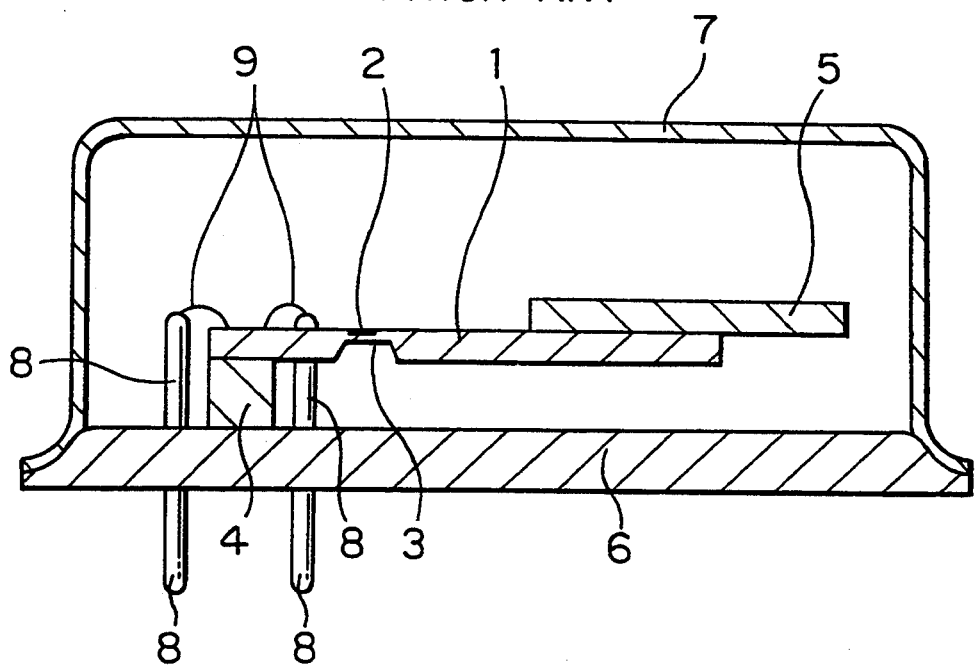
FIG. 5 is a side sectional view of a conventional semiconductor acceleration sensor.
Figure 6:
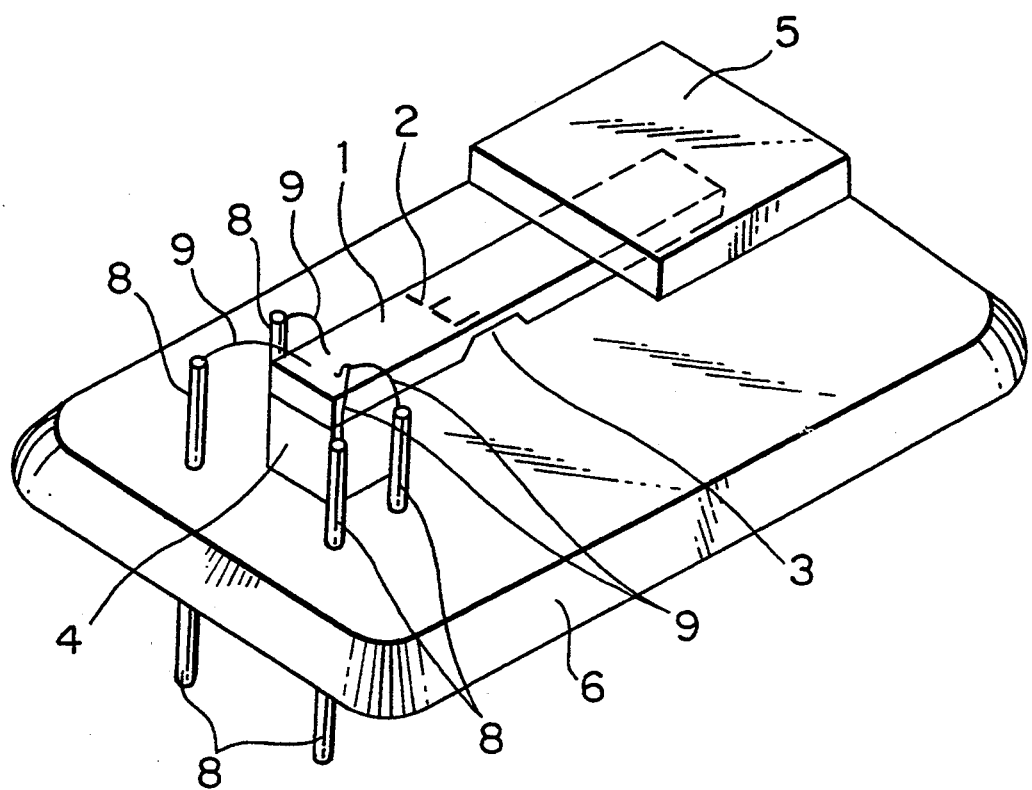
FIG. 6 is a perspective view of the conventional semiconductor acceleration sensor shown in FIG. 5.

In the first embodiment, the two independent electrodes 10 are connected in series with the bridge circuit including the gauge resistors 2. However, as shown in FIGS. 2 and 4, the electrodes 10 and the weight 12 having an electrically conductive material may be connected in parallel with the bridge circuit 24 between the power supply voltage terminal 23 and the grounding terminal 21. In the latter case, the electrodes 10 may be connected through conductors to a disconnection diagnosis circuit 14, so that separation of the weight 12 from the beam 1 during operation of the sensor can be detected as an abnormality in the output of the disconnection diagnosis circuit 14 by a check pin 15. Specifically, the disconnection diagnosis circuit 14 has an output signal indicating a constant level flowing therein during normal operation, whereas when the weight 12 is separated from the beam 1, the disconnection diagnosis circuit 14 outputs a signal at 0 or at a high level. Monitoring the signal output from the disconnection diagnosis circuit 14 makes it possible to readily detect separation of the weight 12.

Although in the foregoing embodiments an electrically conductive material is disposed on a surface of the weight 12 that is secured to the acceleration sensing beam 1, the weight per se may be made of an electrically conductive material such as a metal. In this case, effects similar to those described above are provided.

As has been described above, a device having a simple arrangement positively senses the separation of a weight, so that erroneous operation of the device can be prevented. Thus, it is possible to realize a highly reliable semiconductor acceleration sensor.

What is claimed is:

1. A semiconductor acceleration sensor comprising:
    an acceleration sensing beam having first and second opposed surfaces, opposed first and second ends, a thinner portion between the first and second surfaces intermediate the first and second ends, and gauge resistors disposed on the second surface opposite said thinner portion, said gauge resistors being connected with each other to form a bridge of a bridge circuit;
    a weight secured to the second end of said acceleration sensing beam;
    a footing supporting said acceleration sensing beam at the first end of said acceleration sensing beam;
    a base on which said footing is mounted;
    electrical connection means for electrically connecting said gauge resistors with an external device; and
    at least two mutually independent electrodes disposed on the second surface at the second end of said acceleration sensing beam, a surface of said weight at an interface between said weight and said acceleration sensing beam where said weight is secured to said acceleration sensing beam being electrically conductive and serially connecting said electrodes with a power supply for said bridge circuit.

2. A semiconductor acceleration sensor comprising:
    an acceleration sensing beam having first and second opposed surfaces, opposed first and second ends, a thinner portion between the first and second surfaces intermediate the first and second ends, and gauge resistors disposed on the second surface at said thinner portion, said gauge resistors being connected with each other to form a bridge of a bridge circuit;
    a weight secured to the second end of said acceleration sensing beam;
    a footing supporting said acceleration sensing beam at the first end of said acceleration sensing beam;

a base on which said footing is mounted;

electrical connection means for electrically connecting said gauge resistors with an external device; and at least two mutually independent electrodes disposed on the second surface at the second end of said acceleration sensing beam, a surface of said weight at an interface between said weight and said acceleration sensing beam where said weight is secured to said acceleration sensing beam being electrically conductive and connected to a power supply for said bridge circuit and connected in parallel with said bridge circuit.

3. The semiconductor acceleration sensor of claim 2 including a disconnection diagnosis circuit electrically connected to said weight for indicating disconnection of said weight from said acceleration sensing beam.

* * * * *